(12) United States Patent
Watanabe et al.

(10) Patent No.: US 12,032,736 B2
(45) Date of Patent: Jul. 9, 2024

(54) GAZE BASED TEXT MANIPULATION

(71) Applicant: International Business Machines Corporation, Armonk, NY (US)

(72) Inventors: Kenta Watanabe, Soka (JP); Hiroaki Uetsuki, Machida (JP); Masahito Sugita, Soka (JP); Taihei Miyamoto, Nakano (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/678,417

(22) Filed: Feb. 23, 2022

(65) Prior Publication Data
US 2023/0266817 A1      Aug. 24, 2023

(51) Int. Cl.
  *G06F 3/01*          (2006.01)
  *G06F 40/166*     (2020.01)

(52) U.S. Cl.
  CPC ............ *G06F 3/013* (2013.01); *G06F 40/166* (2020.01)

(58) Field of Classification Search
  CPC .... G06F 3/013; G06F 40/166; G06F 3/04842; G06F 3/012; G06F 40/174
  See application file for complete search history.

(56) References Cited

U.S. PATENT DOCUMENTS

| | | | |
|---|---|---|---|
| 9,383,816 B2 | 7/2016 | Hennelly | |
| 9,766,700 B2* | 9/2017 | Lyons | G06F 3/013 |
| 10,705,602 B2* | 7/2020 | Poulos | G06F 3/011 |
| 11,005,851 B2* | 5/2021 | Kaube | H04L 63/102 |
| 2012/0272179 A1* | 10/2012 | Stafford | G06F 3/038 345/157 |
| 2013/0043302 A1* | 2/2013 | Powlen | G06Q 50/01 235/494 |
| 2014/0198024 A1* | 7/2014 | Adzhigirey | G06F 3/04815 345/156 |

(Continued)

FOREIGN PATENT DOCUMENTS

CN          107066085 B          7/2020

OTHER PUBLICATIONS

Authors et. al.: Disclosed Anonymously, "Primary Device Clipboard Transfer to Execute a Secondary Device Paste with Gaze Based Focus", An IP.com Prior Art Database Technical Disclosure, IP.com No. IPCOM000261473D, IP.com Electronic Publication Date: Mar. 7, 2020, 4 pages.

(Continued)

*Primary Examiner* — Rami R Okasha
(74) *Attorney, Agent, or Firm* — Stephen R. Yoder

(57) ABSTRACT

A computer implemented method for identifying a section of a first display corresponding to a user's initial gaze, identifying a string of text within the identified section of the first display, detecting a shift in the user's gaze from the identified section on the first display to an area on a second display, calculating coordinates corresponding to the area on the second display, identifying an input field in the second display closest to the calculated coordinates, and inputting the identified string of text within the input field in the second display. The method may further include determining whether content currently exists within the input field and subsequently removing the existing content from the input field, and replacing said existing content with the identified text.

20 Claims, 6 Drawing Sheets

(56) References Cited

U.S. PATENT DOCUMENTS

| | | | | |
|---|---|---|---|---|
| 2014/0359521 A1* | 12/2014 | Lin | G06F 3/04842 715/810 |
| 2014/0361971 A1* | 12/2014 | Sala | G06F 3/013 345/156 |
| 2015/0061969 A1* | 3/2015 | Chi | G06F 3/1454 345/2.3 |
| 2015/0103003 A1* | 4/2015 | Kerr | G06F 3/0488 345/158 |
| 2015/0138073 A1* | 5/2015 | Hennelly | G02B 27/0176 345/156 |
| 2015/0277574 A1* | 10/2015 | Jain | G06F 3/04842 345/156 |
| 2015/0309569 A1* | 10/2015 | Kohlhoff | G06V 40/193 382/103 |
| 2015/0364140 A1* | 12/2015 | Thörn | G06F 3/167 704/235 |
| 2016/0291703 A1* | 10/2016 | Tokutake | G06F 3/0346 |
| 2017/0046037 A1* | 2/2017 | Dand | H04M 1/72412 |
| 2018/0217680 A1* | 8/2018 | Sudou | G06F 3/017 |
| 2018/0307303 A1* | 10/2018 | Powderly | G02B 27/0172 |
| 2019/0227763 A1* | 7/2019 | Kaufthal | G06Q 10/101 |
| 2019/0339837 A1* | 11/2019 | Furtwangler | G06F 3/014 |
| 2020/0117325 A1* | 4/2020 | VanBlon | G06V 30/412 |
| 2020/0133389 A1* | 4/2020 | Chiu | G06F 3/012 |
| 2021/0240331 A1* | 8/2021 | Olson | G06F 3/013 |
| 2022/0091815 A1* | 3/2022 | Tumu | G11B 27/34 |
| 2022/0391158 A1* | 12/2022 | Lemmens | G06F 3/1454 |

OTHER PUBLICATIONS

Hayashi et al., "Development of a Text-Based Communication System with Eye Tracking Technology", Sensors and Materials, vol. 28, No. 4 (2016), pp. 311-319.

* cited by examiner

GAZE BASED TEXT MANIPULATION

BACKGROUND

The present invention relates generally to the field of data entry, and more specifically, to identifying and transferring content according to a user's gaze.

Copy and paste mechanisms are very useful in instances where a user wants to assure exact transmission of a string of text; in some cases, a user may wish to input a long text or a difficult to recall text such as a URL from a handwritten paper into a device. Use of optical character recognition (OCR) enables electronic reading of paper text. In some instances, a user may want to copy text from a first device to a second device (for example, copying a hyperlink from a smartphone and pasting it into a PC web browser).

SUMMARY

As disclosed herein, a computer implemented method for identifying a section of a first display corresponding to a user's initial gaze, identifying a string of text within the identified section of the first display, detecting a shift in the user's gaze from the identified section on the first display to an area on a second display, calculating coordinates corresponding to the area on the second display, identifying an input field in the second display closest to the calculated coordinates, and inputting the identified string of text within the input field in the second display. A computer program product and computer system corresponding to the computer implemented method are also disclosed herein.

DETAILED DESCRIPTION

Inputting each character manually with respect to a cross-device copy and paste scenario may be tremendously cumbersome for texts of great length, and may also result in diminished guarantees of accuracy. Current solutions provide a memo sharing application using the cloud, or sharing the link by chat accessible on both devices; however, these solutions require both devices have one of said applications installed and available for use, which can be preclusive in an environment where a user has access to view a device, but may not be able to control applications installed on said device. Optical character recognition mechanisms require time, labor, and equipment to prepare equipment and scan paper text. Various embodiments of the present invention enable content to be copied from a first device and pasted to a second device without requiring shared application installation on the two devices.

Figure 1:
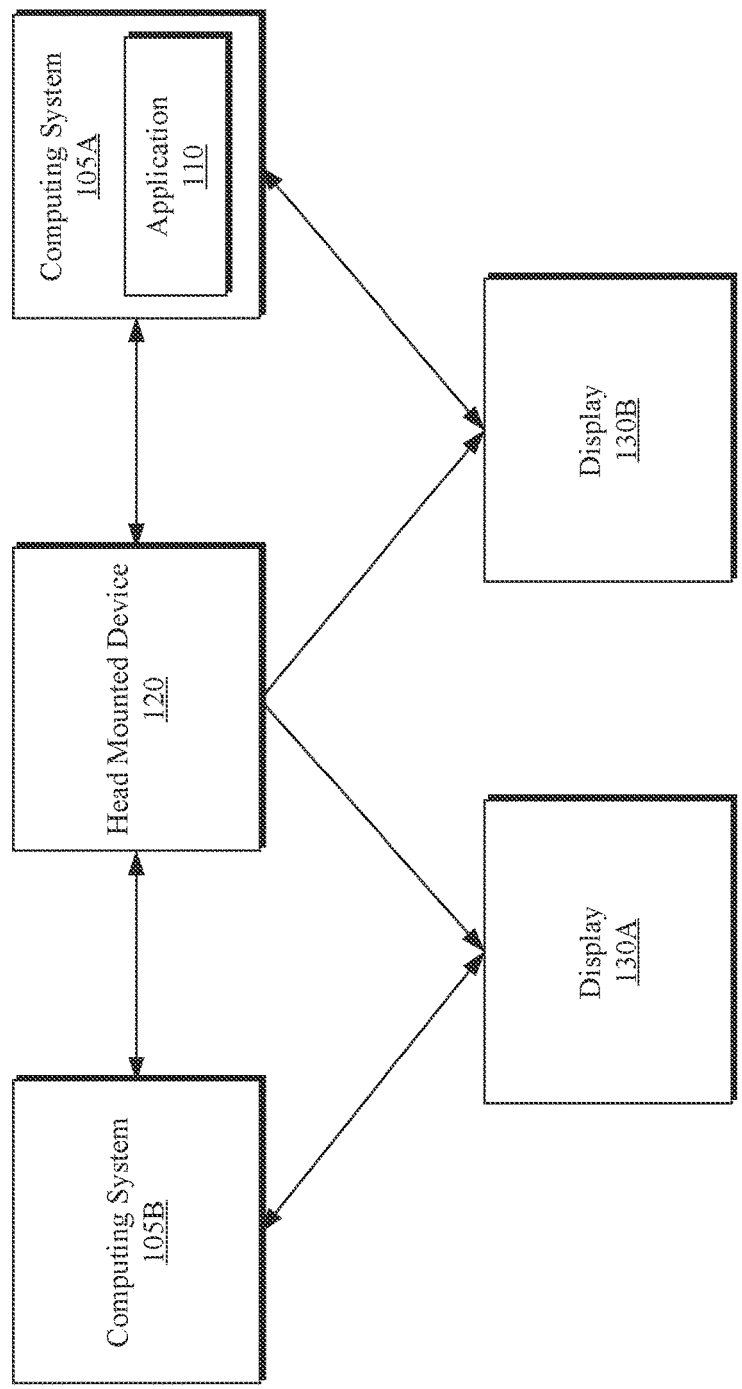
FIG. 1 is a block diagram depicting a gaze tracking system in accordance with at least one embodiment of the present invention.

FIG. 1 is a block diagram depicting a gaze tracking system 100 in accordance with at least one embodiment of the present invention. As depicted, gaze tracking system 100 includes computing systems 105A and 105B, head mounted device 120, and displays 130A and 130B (sometimes called displays 130). Gaze tracking system 100 may be configured to track a user's gaze with respect to content displayed via displays 130. In at least some embodiments, computing system 105 is operably connected to head mounted device 120.

Computing systems 105A/105B (also referred to as computing systems 105) can each be a desktop computer, a laptop computer, a specialized computer server, or any other computer system known in the art. In some embodiments, computing systems 105 represent computer systems utilizing clustered computers to act as a single pool of seamless resources. In general, computing systems 105 are representative of any electronic device, or combination of electronic devices, capable of receiving and transmitting data, as described in greater detail with regard to FIG. 6. Computing systems 105 may include internal and external hardware components, as depicted, and described in further detail with respect to FIG. 6.

As depicted, computing system 105A includes application 110. Application 110 may be configured to execute a text manipulation method such as text manipulation method 200 as described with respect to FIG. 2. Similarly, application 110 may be configured to execute an input field manipulation method, such as input field manipulation method 300 described with respect to FIG. 3. Application 110 may be configured to receive data from head mounted device 120. Application 110 may additionally be configured to send data to display 130B, or computing device 105B operably connected to display 130B.

Head mounted device 120 may include a device worn on the head or as part of a helmet capable of tracking a user's gaze with respect to a corresponding display, such as display 130A. In some embodiments, such as embodiments where head mounted device 120 corresponds to a head mounted display or an optical head mounted display, display 130A is an integrated part of head mounted device 120. In other embodiments, such as embodiments where head mounted device 120 provides no built-in display but is capable of tracking the user's gaze, display 130A is a separate display entirely.

Displays 130A and 130B generally provide a mechanism to display data to a user. As discussed, in some embodiments, display 130A may be an integrated part of head mounted device 120, such as those embodiments in which head mounted device 120 is a head mounted display. In yet other embodiments, display 130A is a detached display, such as a computer monitor. Display 130B may also correspond to a detached display such as a computer monitor.

Figure 2:
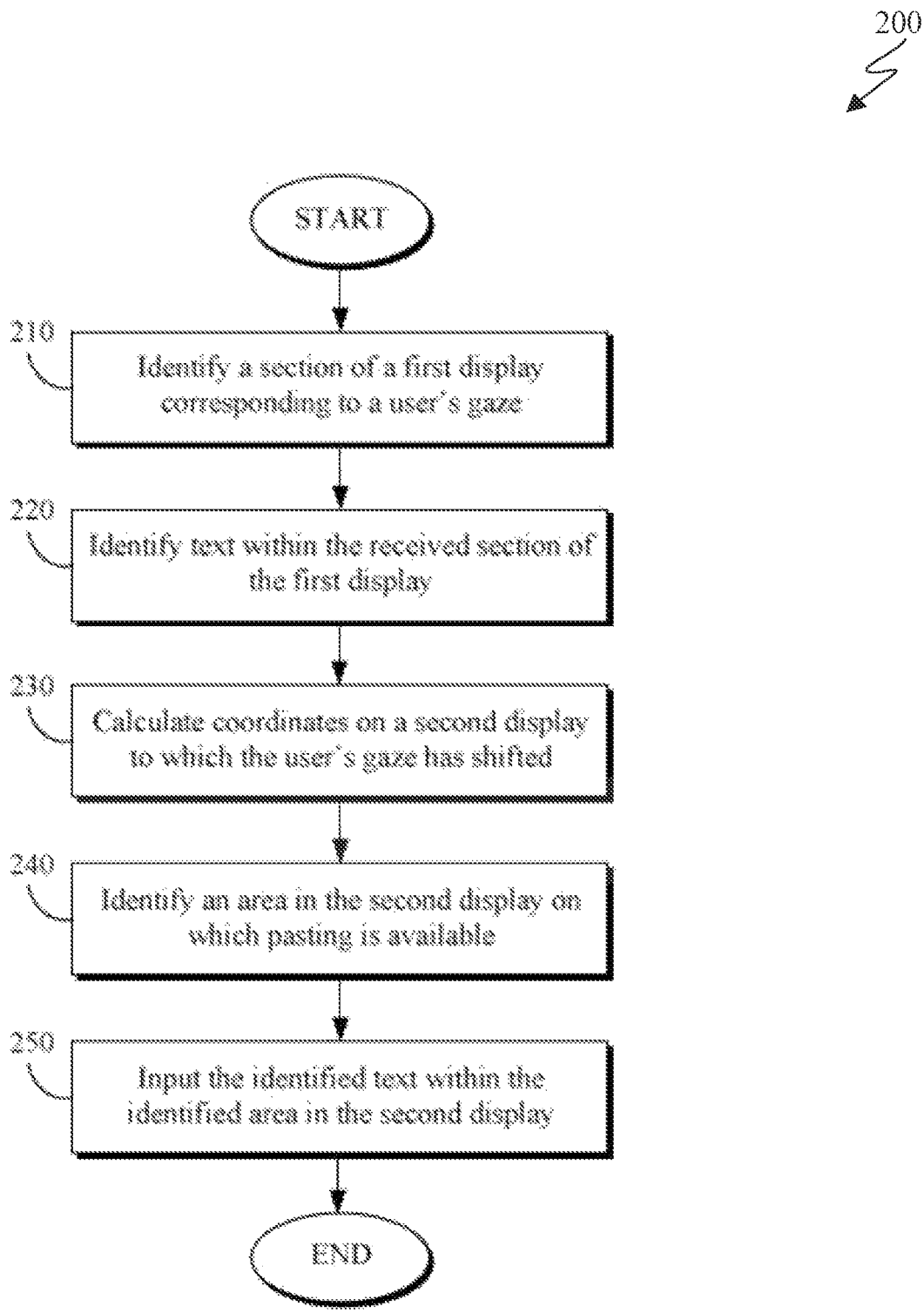
FIG. 2 is a flowchart depicting a text manipulation method in accordance with at least one embodiment of the present invention.

FIG. 2 is a flowchart depicting a text manipulation method 200 in accordance with at least one embodiment of the present invention. As depicted, text manipulation method 200 includes identifying (210) a section of a first display corresponding to a user's gaze, identifying (220) text within the received section of the first display, calculating (230) coordinates on a second display to which the user's gaze has shifted, identifying (240) an area in the second display on which pasting is available, and inputting (250) the identified text within the identified area in the second display.

Identifying (210) a section of a first display corresponding to a user's gaze may include receiving an indication of content being viewed by a user. In at least some embodiments, identifying (210) a section of a first display includes determining a portion of said first display which a user is actively observing. Identifying (210) a section of a first display corresponding to a user's gaze may be initiated via a command from a user, either verbally or via other means such as a button, etc. Identifying (210) a section of a first display corresponding to a user's gaze may include receiving a command, such as a verbal instruction, indicating the beginning of a copy instruction. Responsive to receiving such a command, identifying (210) a section of a first display corresponding to a user's gaze may further include monitoring the user's gaze using eye tracking mechanisms known in the art. In an embodiment, a user may look at a single place for a defined period of time N to commence a copy instruction. Subsequent to the user's gaze remaining fixed for the defined period of time N, identifying (210) a section of a first display corresponding to a user's gaze may include obtaining coordinates of the display area on which the user's gaze has remained fixed. The user's gaze may then be tracked until the user again fixes their gaze on a single point for a defined period of time O, wherein fixing a gaze for time period O indicates conclusion of a copy command. In such embodiments, identifying (210) a section of a first display includes identifying the section of display viewed between the initiation command and the conclusion command. In at least some embodiments, a head mounted device may monitor the user's gaze to identify a section of a display the user is observing. A front camera corresponding to the user may be used to monitor the user's gaze. Generally, identifying (210) a section of a first display corresponding to a user's gaze may include capturing an image of the user's field of view, wherein the image includes the first display.

Identifying (220) text within the received section of the first display may include utilizing existing optical character recognition techniques to extract a character string T corresponding to the received section of the first display. Optical character recognition techniques include using an optical character reader (OCR) to convert images of typed, handwritten or printed text into machine-encoded text. Any number of current methodologies for character recognition may be appropriate. In at least one embodiment, identifying (220) text within the received section of the first display includes leveraging standard optical character recognition to target typewritten text one glyph or character at a time from the received section of the display. In at least one embodiment, identifying (220) text within the received section of the first display includes utilizing optical word recognition techniques, which also target typewritten text similar to standard OCR, but targets the text one word at a time rather than one language at a time (notably for languages that use a space as a word divider). In at least one embodiment, identifying (220) text within the received section of the first display includes utilizing intelligent character recognition (ICR) techniques, which can target handwritten printscript or cursive texts one glyph or character at a time. Many ICR techniques include a machine learning component to train the mechanisms to recognize the characters. In at least one embodiment, identifying (220) text within the received section of the first display includes leveraging intelligent word recognition (IWR) techniques, which can target handwritten printscript or cursive texts one word at a time. IWR techniques are especially useful in cases where words are not separated, such as in cursive scripts for some languages. In at least some embodiments, identifying (220) text within the received section of the first display includes pre-processing the received section of the first display to improve clarity of the image of the received section. Pre-processing techniques include de-skewing (rotating an image to make lines of text perfectly vertical or horizontal), despeckling (removing positive or negative spots and smoothing edges), binarization (converting an image from color or greyscale to black and white), line removal (cleaning up non-glyph boxes and lines), layout analysis or "zoning" (identifying columns, paragraphs, captions, and such as distinct blocks, especially with respect to documents including multi-column layouts and tables), character isolation or "segmentation" (separating multiple characters that are connected due to image artifacts), and normalizing aspect ratio and scale.

In at least some embodiments, identifying (220) text within the received section of the first display may prove cumbersome due to tightly spaced characters in the received section. In such embodiments, identifying (220) text within the received section of the first display may additionally include providing a magnified version of the received section of the first display to the user such that the user's gaze may then be analyzed with respect to the magnified section to more accurately identify text of interest. Identifying (220) text within the received section of the first display may include copying said identified text via a copy command or other mechanism for copying content.

In some embodiments, notably those wherein copying and pasting are available for data items beyond just text (such as images and screen captures), identifying (220) text within the received section of the first display may be skipped entirely, as the received section will be pasted in its entirety.

Calculating (230) coordinates on a second display to which the user's gaze has shifted may include determining that the user has shifted their gaze away from the first display to a second display. In at least some embodiments, calculating (230) coordinates on a second display includes receiving an alert or indication that the user's gaze has shifted away from the first display. In other embodiments, calculating (230) coordinates on a second display includes monitoring the user's gaze for the presence of the first display, and identifying a second display in the user's field of view responsive to determining that the user's gaze has shifted away from the first display. In at least some embodiments, calculating (230) coordinates on a second display includes identifying an area on the second display on which the user's gaze is fixed. Calculating (230) coordinates on a second display may include applying a mapping to the user's field of view such that any one point is identifiable via a set of coordinates; for example, one may apply an X, Y coordinate plane to the user's field of view such that a single point is identifiable by its horizontal X position and its vertical Y position. Calculating (230) coordinates on a second display to which the user's gaze has shifted may include identifying the coordinates of the mapping corresponding to the position on which the user's gaze is fixed. Calculating (230) coordinates on a second display to which the user's gaze has shifted may include capturing an image P of the user's visual field, wherein the user's visual field includes the second display.

Identifying (240) an area in the second display on which pasting is available may include analyzing the content currently displayed by the second display and identifying one or more sections corresponding to an input field. An input field as used herein may correspond to any section or field configured to receive user input, most often in the form of text. For example, an input field may correspond to a search box or other text box configured to receive input via a user keyboard or other mechanism for character input. In at least some embodiments, identifying (240) an area in the second display on which pasting is available includes identifying an input field closest to the user's gaze. In embodiments where multiple input fields are equally proximate to the user's gaze, identifying (240) an area in the second display on which pasting is available may include presenting each as an option to the user and enabling the user to confirm the selection. For example, the input fields may appear highlighted one at a time, and the user may confirm when the correct input field or area is highlighted either verbally or by a predetermined command such as an interaction with a button or touch pad. In cases where many input fields are adjacent within the user's field of vision and it is potentially cumbersome to identify which is the user's point of focus, identifying (240) an area in the second display on which pasting is available may include providing a magnified version of the area corresponding to the user's gaze and tracking the user's gaze with respect to this magnified version to identify an input field which the user is looking at.

Inputting (250) the identified text within the identified area in the second display may include entering the identified text into the identified area (or identified input field). In embodiments wherein the identified text or strings of characters were previously copied, inputting (250) the identified text within the identified area in the second display includes pasting the identified text or string of characters. In embodiments where characters or images are already present at the identified area in the second display, inputting (250) the identified text within the identified area may include adjusting the input region to either precede or follow the content already present in the identified area.

In systems in which gaze based copying and pasted is intended to be implemented, sections corresponding to confidential contents may be tagged as such, and copying with respect to these sections may be restricted. In at least some embodiments, data transmission of copied text from the first display to the input field of the second display may be limited to the device of origin for the copied text and the intended destination device connected to the second display; in other words, in such embodiments, transmission of the content to be pasted is limited to the device connected to the second display, and an intermediate device is not allowed to receive said content.

In some embodiments of the present invention wherein the head mounted device and the device connected to the second display are not connected, the method may additionally include converting the copied text/character string into a QR code and displaying the QR code on the outer side of the head mounted device. In such embodiments, the QR code may be detected and read by a front camera of the device connected to the second display such that the character string is then transmitted to said device. The front camera may additionally be used to track the user's gaze and obtain coordinates corresponding to a paste destination area, after which the text/character string may be pasted into the destination area accordingly.

In some embodiments of the present invention, copy-paste gaze based input mechanics may be provided as a function of an application; in other embodiments, copy-paste gaze based mechanics may be provided in systemwide form, such as by being integrated into the OS. In embodiments wherein a copy target exists on a device connected to the head mounted device, instead of using the head mounted device to obtain characters by OCR, the copy source device may receive an indication of the area being observed by the user via the head mounted device, and may then obtain the corresponding character string and either transmit it to the head mounted device or directly to a second device indicated by the user's shifted gaze.

Figure 3:
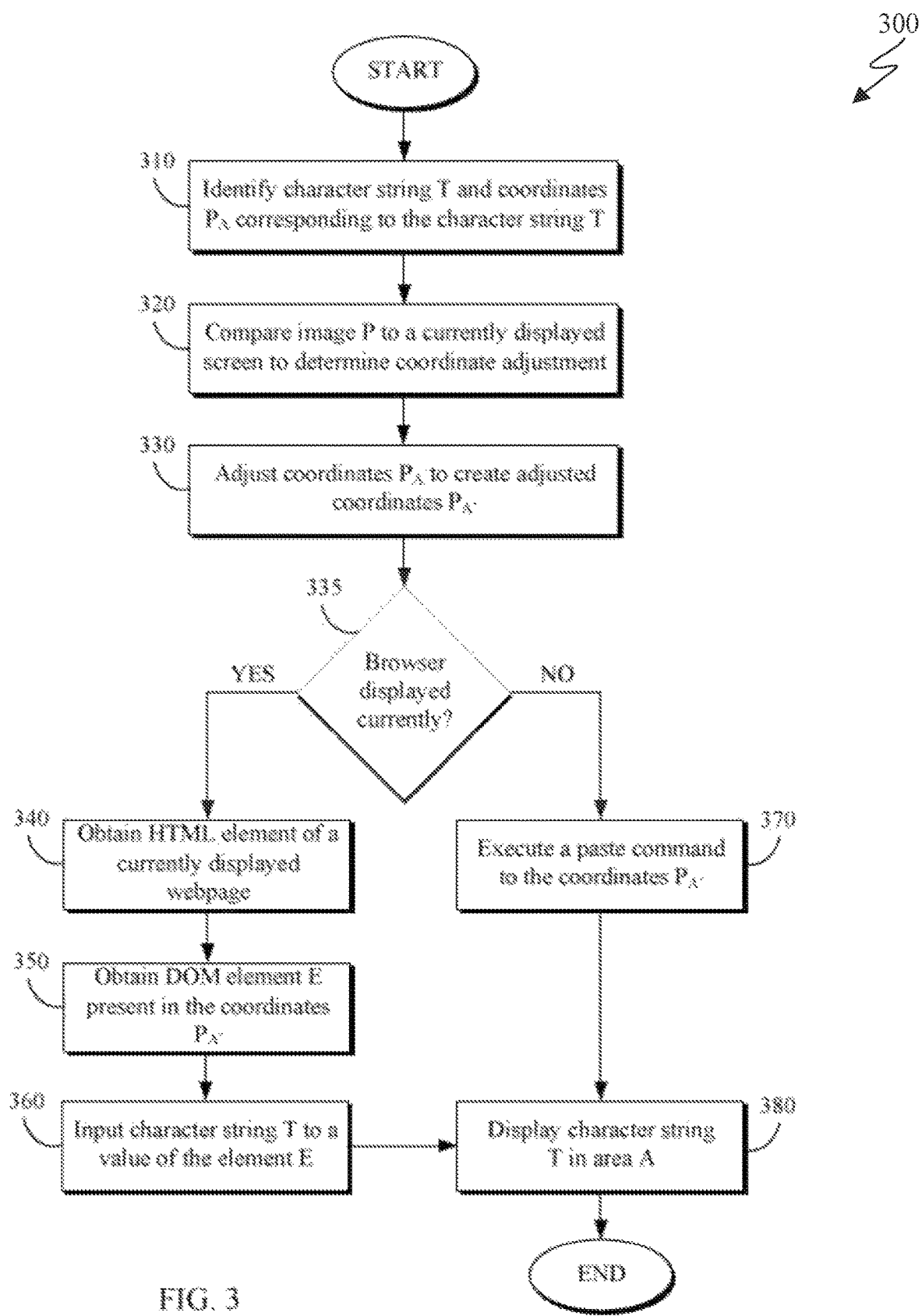
FIG. 3 is a flowchart depicting an input field manipulation method in accordance with at least one embodiment of the present invention.

FIG. 3 is a flowchart depicting an input field manipulation method 300 in accordance with at least one embodiment of the present invention. As depicted, input field manipulation method 300 includes identifying (310) a character string T and coordinates $P_A$ corresponding to the character string T, comparing (320) image P to a currently displayed screen to determine coordinate adjustment, adjusting (330) coordinates $P_A$ to create adjusted coordinates $P_{A'}$, determining (335) whether a browser is currently displayed, obtaining (340) an HTML element of a currently displayed webpage, obtaining (350) a DOM element E present with respect to the coordinates $P_{A'}$, inputting (360) character string T to a value of the element E, executing (370) a paste command to the coordinates $P_{A'}$, and displaying (380) character string T into area A.

Identifying (310) a character string T and coordinates $P_A$ corresponding to the character string T includes receiving an indication of content being viewed by a user in the form of a character string T and coordinates $P_A$ of an image P of the user's visual field. In at least some embodiments, identifying (310) a character string T and coordinates $P_A$ includes determining a portion of said first display which a user is actively observing. Identifying (310) a character string T and coordinates $P_A$ corresponding to the character string T may be initiated via a command from a user, either verbally or via other means such as a button, etc. Identifying (310) a character string T and coordinates $P_A$ corresponding to the character string T may include receiving a command, such as a verbal instruction, indicating the beginning of a copy instruction. Responsive to receiving such a command, identifying (310) a character string T and coordinates $P_A$ corresponding to the character string T may further include monitoring the user's gaze using eye tracking mechanisms known in the art. In an embodiment, a user may look at a single place for a defined period of time N to commence a copy instruction. Subsequent to the user's gaze remaining fixed for the defined period of time N, identifying (310) a character string T and coordinates $P_A$ corresponding to the character string T may include obtaining coordinates of the display area on which the user's gaze has remained fixed. The user's gaze may then be tracked until the user again fixes their gaze on a single point for a defined period of time O, wherein fixing a gaze for time period O indicates conclusion of a copy command. In such embodiments, identifying (310) a character string T and coordinates $P_A$ corresponding to the character string T includes identifying the section of display viewed between the initiation command and the conclusion command. In at least some embodiments, a head mounted device may monitor the user's gaze to identify a section of a display the user is observing. A front camera corresponding to the user may be used to monitor the user's gaze. Generally, identifying (310) a character string T and coordinates $P_A$ corresponding to the character string T may include capturing an image of the user's field of view, wherein the image includes the first display.

Comparing (320) image P to a currently displayed screen to determine coordinate adjustment may include identifying an area on the currently displayed screen on which the user's gaze is fixed, and applying a mapping to the user's field of view such that any one point is identifiable via a set of coordinates; for example, one may apply an X, Y coordinate plane to the user's field of view such that a single point is identifiable by its horizontal X position and its vertical Y position. Comparing (320) image P to a currently displayed screen may include identifying the coordinates of the mapping corresponding to the position on which the user's gaze is fixed. Comparing (320) image P to a currently displayed screen may include determining an adjustment to coordinates with respect to the image P such that the adjusted coordinates reflect an area's position relative to the displayed screen, rather than relative to the entirety of the image P. For example, it may be determined that, with respect to coordinates as applied to the entire image P, the zero point of the X axis for the displayed screen appears at X value X', and the zero point of the Y axis for the displayed screen appears at Y value Y'. Coordinate translation in this manner ensures that the paste area is identified according to the appropriate position on the display itself, rather than in the user's entire field of view. Subsequently, adjusting (330) coordinates $P_A$ to create adjusted coordinates $P_{A'}$ may include applying the identified necessary translation to the specific coordinates $P_A$ of the paste area.

Determining (335) whether a browser is currently displayed may include analyzing content currently displayed on the screen to determine whether a browser is present. If a browser is currently displayed (335, yes branch), the method continues by obtaining (340) an HTML element of a currently displayed webpage. If a browser is not currently displayed (335, no branch), the method continues by executing a paste command to the coordinates $P_{A''}$.

Obtaining (340) an HTML element of a currently displayed webpage may include analyzing the displayed browser to identify an HTML element corresponding to the currently displayed browser. Obtaining (350) a document object model (DOM) element E present with respect to the coordinates $P_{A'}$ may include identifying a DOM element within the HTML element of the currently displayed webpage which corresponds to the location indicated by the coordinates $P_{A''}$. Inputting (360) character string T to a value of the element E may include amending element E to include the character string T. In some embodiments where content already exists within element E, inputting (360) character string T includes adding character string T before or after the existing content. In other embodiments where content already exists within element E, inputting (360) character string T includes removing said content and replacing it with character string T.

Executing (370) a paste command to the coordinates $P_{A'}$ may include pasting character string T into the input area corresponding to the coordinates $P_{A''}$. Inputting (360) character string T and executing (370) a paste command to the coordinates $P_{A'}$ both result in displaying (380) character string T in area A.

Figure 4:
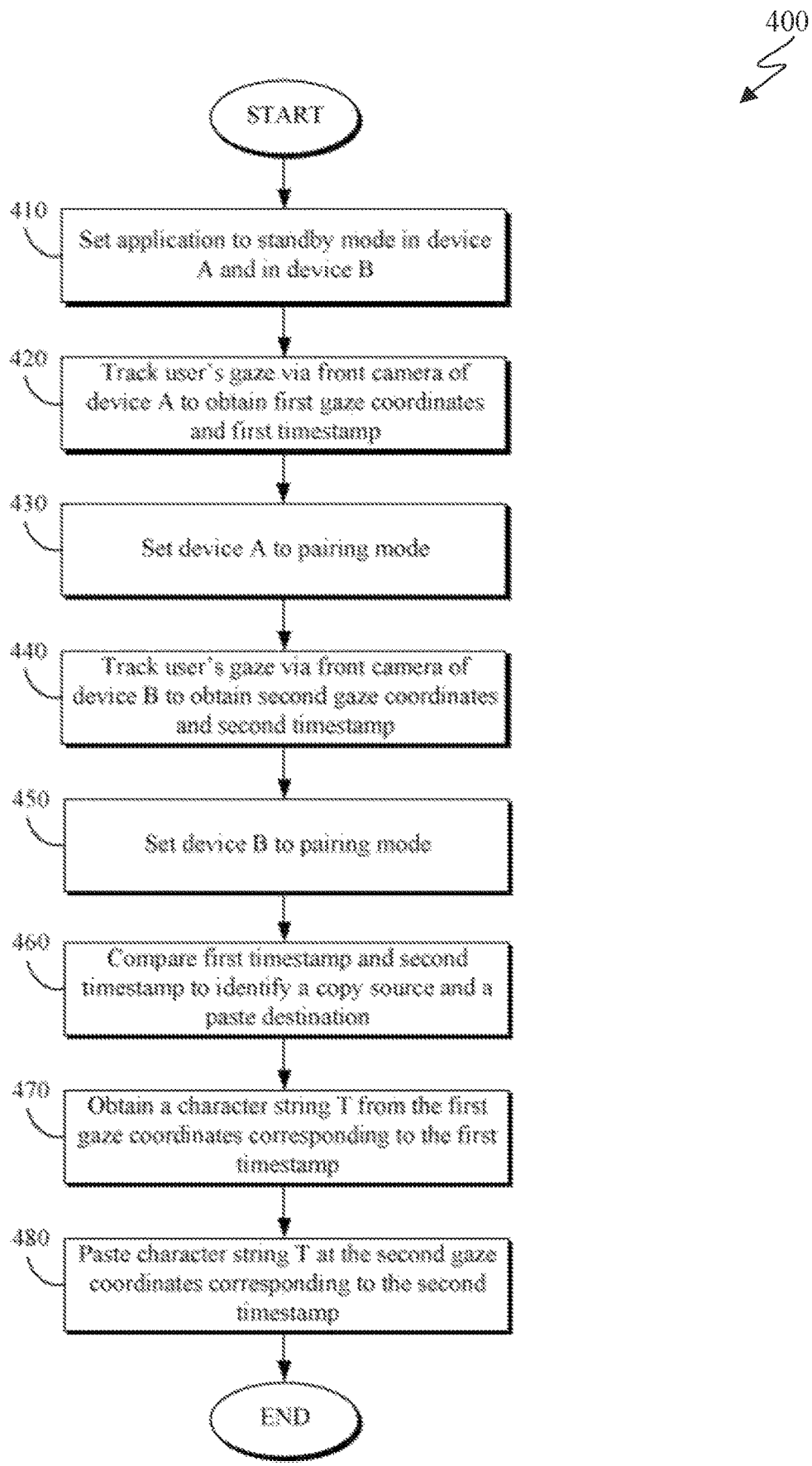
FIG. 4 is a flowchart depicting a gaze based input method in accordance with an embodiment of the present invention.

FIG. 4 is a flowchart depicting a gaze based input method 400 in accordance with an embodiment of the present invention. As depicted, gaze based input method 400 includes setting (410) an application to standby mode in device A and device B, tracking (420) a user's gaze via a front camera of device A to obtain first gaze coordinates and a first timestamp, setting (430) device A into pairing mode, tracking (440) the user's gaze via a front camera of device B to obtain second gaze coordinates and a second timestamp, setting (450) device B into pairing mode, comparing (460) the first timestamp to the second timestamp to identify a copy source and a paste destination, obtaining (470) a character string T from the first gaze coordinates corresponding to the first timestamp, and pasting (480) character string T at the second gaze coordinates corresponding to the second timestamp. Gaze based input method 400 may enable gaze based copy and paste commands in an environment where a head mounted device is unavailable for gaze tracking.

Setting (410) an application to standby mode in device A and device B may include ensuring an application configured to enable gaze based input manipulation is available on both a first device A and a second device B. In at least some embodiments, setting (410) an application to standby mode in device A and device B includes placing the application in a state allowing the applications to be communicated with and activated. In general, setting (410) an application to standby mode in device A and device B includes making the application in each device accessible and/or reachable.

Tracking (420) a user's gaze via a front camera of device A to obtain first gaze coordinates and a first timestamp may include receiving a feed from a front camera of device A and analyzing said feed to track the user's gaze. Gaze tracking as achieved via a camera may include detecting a location of the user's face, detecting the user's eyes within the face, identifying the orientation of the left and right eye, and mapping the orientation of the eyes onto a coordinate system corresponding to a display. Tracking (420) a user's gaze via a front camera may include identifying coordinates corresponding to the area observed by the user, referred to as first gaze coordinates, and a timestamp at which said coordinates are observed by the user.

Setting (430) device A into pairing mode may include placing device A in a discoverable mode such that other devices can identify device A for connection and/or communication. In general, setting (430) device A into pairing mode includes any methodology for making device A available for communications with device B. In at least some embodiments, the first timestamp may correspond to the time at which device A is placed in pairing mode rather than the time at which the first gaze coordinates are observed by the user.

Tracking (440) the user's gaze via a front camera of device B to obtain second gaze coordinates and a second timestamp may include receiving a feed from a front camera of device B and analyzing said feed to track the user's gaze. Gaze tracking as achieved via a camera may include detecting a location of the user's face, detecting the user's eyes within the face, identifying the orientation of the left and right eye, and mapping the orientation of the eyes onto a coordinate system corresponding to a display. Tracking (440) a user's gaze via a front camera of device B may include identifying coordinates corresponding to the area observed by the user, referred to as second gaze coordinates, and a timestamp at which said coordinates are observed by the user, referred to as a second timestamp.

Setting (450) device B into pairing mode may include placing device B in a discoverable mode such that other devices can identify device B for connection and/or communication. In general, setting (450) device B into pairing mode includes any methodology for making device B available for communications with device A. In at least some embodiments, the second timestamp may correspond to the time at which device B is placed in pairing mode rather than the time at which the second gaze coordinates are observed by the user.

Comparing (460) the first timestamp to the second timestamp to identify a copy source and a paste destination may include executing a comparison between the two timestamps to determine whether the first timestamp or the second timestamp occurred earliest. Once the result of the comparison is determined, comparing (460) the first timestamp to the second timestamp includes identifying the device with the earlier timestamp as the copy source, and the other device as the paste destination.

Obtaining (470) a character string T from the first gaze coordinates corresponding to the first timestamp may include utilizing existing optical character recognition techniques to extract a character string T corresponding to the area indicated by the first gaze coordinates. Optical character recognition techniques include using an optical character reader (OCR) to convert images of typed, handwritten or printed text into machine-encoded text. Any number of current methodologies for character recognition may be appropriate; many appropriate techniques are described previously with respect to FIG. 2.

Pasting (480) character string T at the second gaze coordinates corresponding to the second timestamp may include entering the identified text into the area corresponding to the paste destination. In embodiments where characters or images are already present at the identified area in the second display, pasting (480) character string T at the second gaze coordinates may include adjusting the input region to either precede or follow the content already present in the identified area.

Figure 5A:
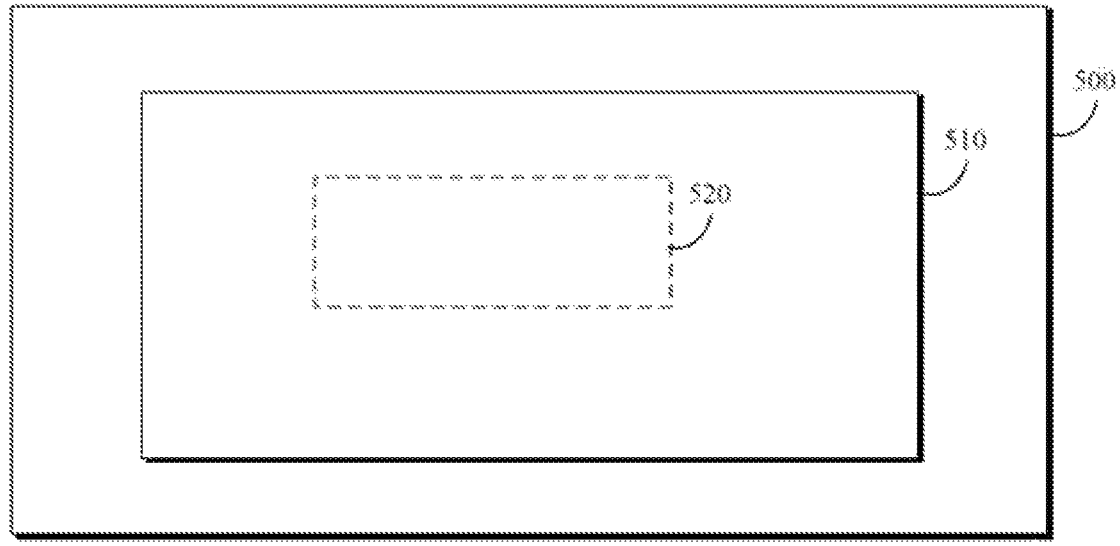
FIG. 5A depicts a capture of a user's visual field in accordance with an embodiment of the present invention.

FIG. 5A depicts a capture of a user's visual field 500 in accordance with an embodiment of the present invention. As depicted, user's visual field 500 includes a display 510 and an observed area 520. Observed area 520 may be identified within display 510 based on gaze tracking data corresponding to the user's gaze. Notably, it should be appreciated that display 510 does not wholly encompass user's visual field 500, hence the need for coordinate transposition with respect to the two spaces.

Figure 5B:
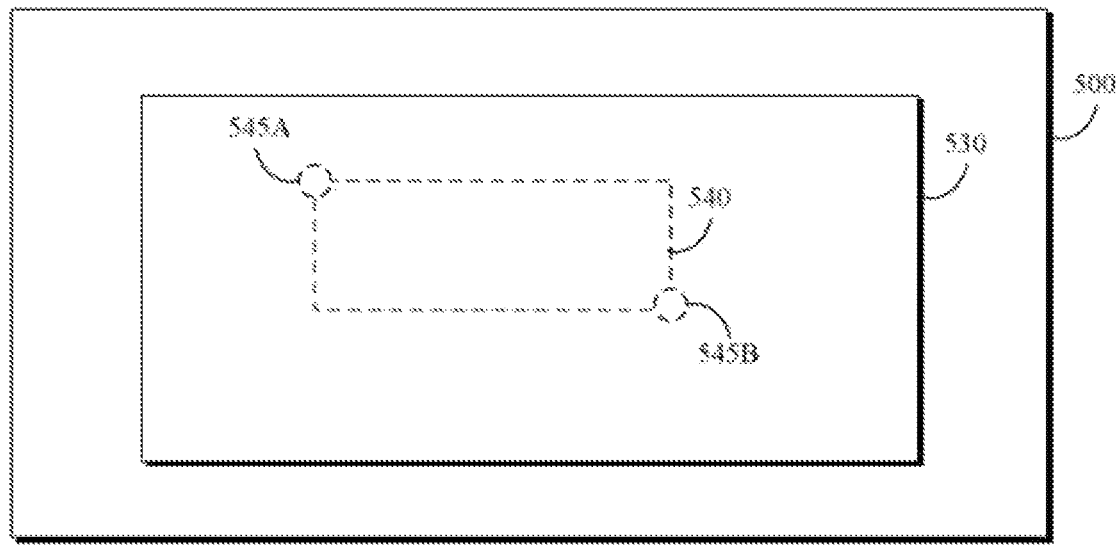
FIG. 5B depicts a capture of a user's visual field in accordance with an embodiment of the present invention.

FIG. 5B depicts a capture of a user's visual field 500 in accordance with an embodiment of the present invention. As depicted, user's visual field 500 includes display 530, observed area 540, and endpoints 545A and 545B (sometimes called endpoints 545). With respect to the depicted embodiment, endpoints 545 may correspond to points indicated by a user at which to begin or end a copy mechanism. As described previously, endpoints 545 may be indicated using a gesture or a verbal command in combination with the user's tracked gaze. With respect to the depicted embodiment, endpoint 545A may correspond to a starting point, and endpoint 545B may correspond to a concluding point.

Figure 6:
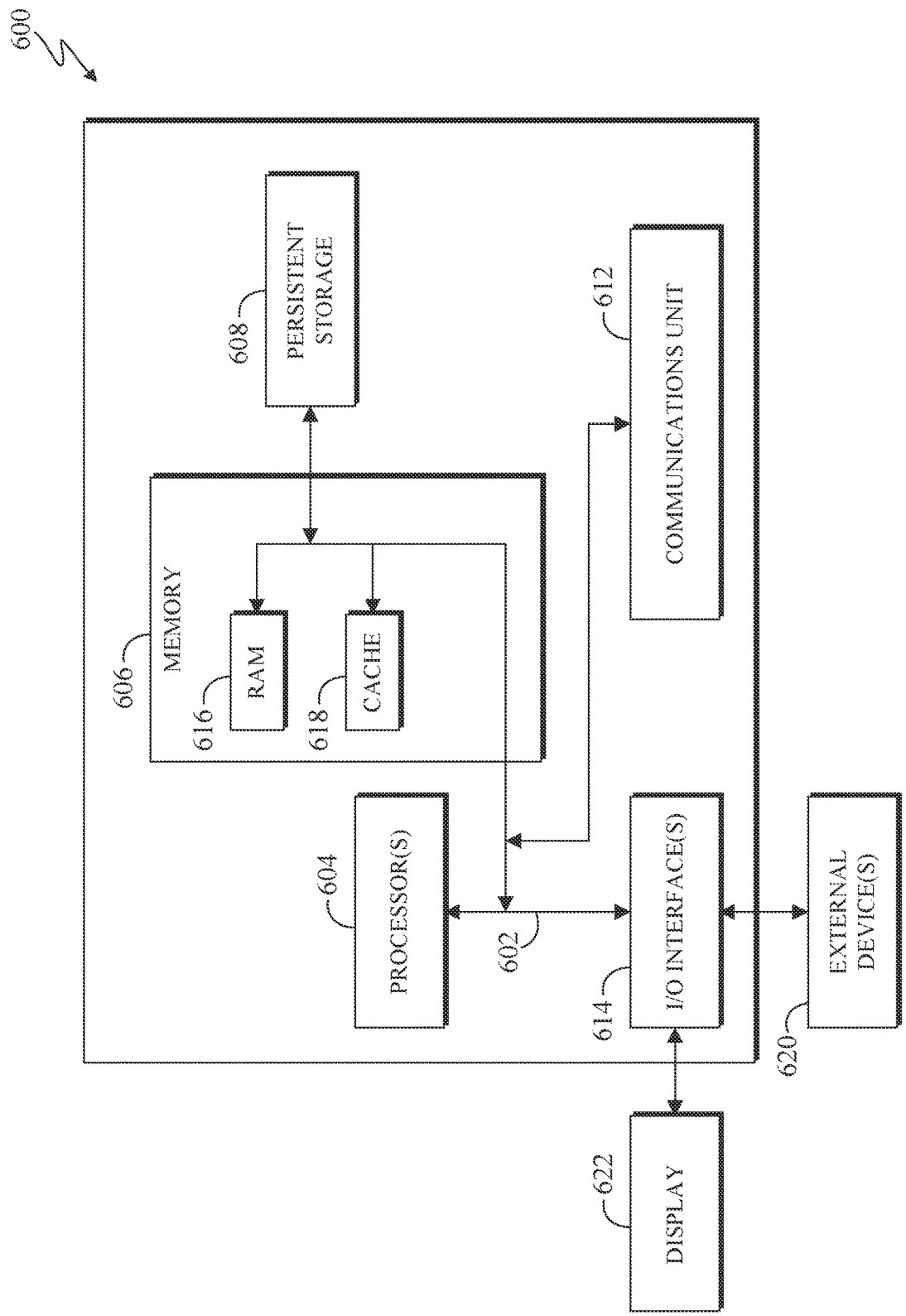
FIG. 6 is a block diagram of components of a computing system in accordance with an embodiment of the present invention.

FIG. 6 depicts a block diagram of components of computing system 105 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   capturing an image of a user's field of view via a head mounted user device, wherein the image includes a first display of a first additional device;
   identifying a section of the first display depicted in the captured image corresponding to the user's initial gaze;
   identifying a string of text within the identified section of the first display of the first additional device;

detecting a shift in the user's gaze from the identified section on the first display to an area on a second display corresponding to a second additional device, wherein the user device and the second additional device are not connected;
converting the identified string of text into a QR code;
displaying the QR code on an outer side of the head mounted user device visible to a camera of the second additional device;
reading, by the camera of the second additional device, the QR code; and
transmitting, to the second additional device, the identified string of text to be pasted in the area on the second display corresponding to the shift in the user's gaze.

2. The computer implemented method of claim 1, further comprising inputting the identified string of text within an input field in the second display.

3. The computer implemented method of claim 1, further comprising:
calculating coordinates corresponding to the area on the second display;
identifying an input field in the second display closest to the calculated coordinates;
determining whether content currently exists within the input field; and
responsive to determining content currently exists within the input field, removing the existing content from the input field, and replacing said existing content with the identified string of text.

4. The computer implemented method of claim 1, further comprising:
calculating coordinates corresponding to the area on the second display;
identifying an input field in the second display closest to the calculated coordinates;
determining whether content currently exists within the input field; and
responsive to determining content currently exists within the input field, adding the identified string of text at the conclusion of the existing content.

5. The computer implemented method of claim 1, further comprising tracking the user's gaze with one or more cameras.

6. The computer implemented method of claim 1, further comprising tracking the user's gaze with a head mounted device.

7. The computer implemented method of claim 1, further comprising receiving a user command requesting execution of a copy command.

8. A computer program product comprising:
one or more computer readable storage media and program instructions stored on the one or more computer readable storage media, the program instructions comprising instructions to:
capture an image of a user's field of view via a head mounted user device, wherein the image includes a first display of a first additional device;
identify a section of the first display depicted in the captured image corresponding to the user's initial gaze;
identify a string of text within the identified section of the first display of the first additional device;
detect a shift in the user's gaze from the identified section on the first display to an area on a second display corresponding to a second additional device, wherein the user device and the second additional device are not connected;
convert the identified string of text into a QR code;
display the QR code on an outer side of the head mounted user device visible to a camera of the second additional device;
read, by the camera of the second additional device, the QR code; and
transmit, to the second additional device, the identified string of text to be pasted in the area on the second display corresponding to the shift in the user's gaze.

9. The computer program product of claim 8, the program instructions further comprising instructions to:
calculate coordinates corresponding to the area on the second display;
identify an input field in the second display closest to the calculated coordinates;
determine whether content currently exists within the input field; and
responsive to determining content currently exists within the input field, remove the existing content from the input field, and replace said existing content with the identified string of text.

10. The computer program product of claim 8, further comprising program instructions to input the identified string of text within an input field in the second display.

11. The computer program product of claim 8, the program instructions further comprising instructions to:
determine whether content currently exists within the input field; and
responsive to determining content currently exists within the input field, add the identified string of text at the conclusion of the existing content.

12. The computer program product of claim 8, the program instructions further comprising instructions to track the user's gaze with one or more cameras.

13. The computer program product of claim 8, the program instructions further comprising instructions to track the user's gaze with a head mounted device.

14. The computer program product of claim 8, the program instructions further comprising instructions to receive a user command requesting execution of a copy command.

15. A computer system comprising:
one or more computer processors;
one or more computer-readable storage media;
program instructions stored on the computer-readable storage media for execution by at least one of the one or more processors, the program instructions comprising instructions to:
capture an image of a user's field of view via a head mounted user device, wherein the image includes a first display of a first additional device;
identify a section of the first display depicted in the captured image corresponding to the user's initial gaze;
identify a string of text within the identified section of the first display of the first additional device;
detect a shift in the user's gaze from the identified section on the first display to an area on a second display corresponding to a second additional device, wherein the user device and the second additional device are not connected;
convert the identified string of text into a QR code;
display the QR code on an outer side of the head mounted user device visible to a camera of the second additional device;
read, by the camera of the second additional device, the QR code; and transmit, to the second additional device, the identified string of text to be pasted in the area on the second display corresponding to the shift in the user's gaze.

16. The computer system of claim 15, the program instructions further comprising instructions to:
calculate coordinates corresponding to the area on the second display;
identify an input field in the second display closest to the calculated coordinates;
determine whether content currently exists within the input field; and
responsive to determining content currently exists within the input field, remove the existing content from the input field, and replace said existing content with the identified string of text.

17. The computer system of claim 15, the program instructions further comprising instructions to:
calculate coordinates corresponding to the area on the second display;
identify an input field in the second display closest to the calculated coordinates;
determine whether content currently exists within the input field; and
responsive to determining content currently exists within the input field, add the identified string of text at the conclusion of the existing content.

18. The computer system of claim 15, the program instructions further comprising instructions to track the user's gaze with one or more cameras.

19. The computer system of claim 15, the program instructions further comprising instructions to track the user's gaze with a head mounted device.

20. The computer system of claim 15, the program instructions further comprising instructions to receive a user command requesting execution of a copy command.

* * * * *